(12) United States Patent
Meis (10) Patent No.: US 6,385,947 B2
(45) Date of Patent: May 14, 2002

(54) METHOD OF AND APPARATUS FOR ACCUMULATING AND MANIPULATING ARRAYS OF CIGARETTES AND THE LIKE

(75) Inventor: Hartmut Meis, Hamburg (DE)

(73) Assignee: Topack Verpackungstechnik GmbH, Schwarzenback (DE)

( * ) Notice: Subject to any disclaimer, the term of this patent is extended or adjusted under 35 U.S.C. 154(b) by 0 days.

(21) Appl. No.: 09/736,189

(22) Filed: Dec. 15, 2000

(30) Foreign Application Priority Data

Dec. 15, 1999 (DE) ........................................ 199 60 475
Nov. 3, 2000 (DE) ........................................ 100 11 989

(51) Int. Cl.$^7$ .............................................. B65B 19/04
(52) U.S. Cl. .......................................... 53/444; 53/148
(58) Field of Search ........................ 53/148, 234, 444, 53/575

(56) References Cited

U.S. PATENT DOCUMENTS

| | | |
|---|---|---|
| 3,106,282 A | 10/1963 | Schmermund |
| 3,278,077 A | 10/1966 | Schmermund |
| 4,281,670 A | 8/1981 | Heitmann et al. |
| 4,339,026 A | 7/1982 | Bäse et al. |
| 4,471,866 A | 9/1984 | Erdmann et al. |
| 4,735,032 A | 4/1988 | Focke |
| 4,901,860 A | 2/1990 | Wahle et al. |
| 5,135,008 A | 8/1992 | Oesterling et al. |
| 5,472,078 A | 12/1995 | Hoffmann et al. |
| 5,617,943 A | 4/1997 | Belvederi et al. |
| 5,718,102 A | 2/1998 | Draghetti |

FOREIGN PATENT DOCUMENTS

| | | |
|---|---|---|
| DE | 19 03 728 | 8/1970 |
| DE | 24 29 795 | 1/1975 |
| EP | 08 78 397 | 4/1998 |
| EP | 0 878 397 A1 | 11/1998 |
| FR | 2 012 136 | 6/1969 |

Primary Examiner—Scott A. Smith
Assistant Examiner—Nathaniel Chukwurah
(74) Attorney, Agent, or Firm—Venable; Robert Kinberg (57) ABSTRACT

Blocks of plain or filter cigarettes are accumulated in at least two group building assemblies each of which comprises at least two block forming units receiving cigarettes by gravity flow by way of upright ducts. The assemblies are adjacent the path of a series of successive receptacles which serve to transport discrete blocks stepwise to a multiple-track packing machine. The units accumulate blocks of cigarettes during intervals which include the duration of at least one stepwise movement of the receptacles and that of at least one period of standstill of the receptacles. Such intervals suffice to ensure satisfactory gathering of cigarettes into blocks of required size and shape at a frequency which is required for full-speed operation of the multiple-track packing machine.

19 Claims, 5 Drawing Sheets

METHOD OF AND APPARATUS FOR ACCUMULATING AND MANIPULATING ARRAYS OF CIGARETTES AND THE LIKE

CROSS-REFERENCE TO RELATED CASES

The present application claims the priority of commonly owned German patent application Ser. Nos. 199 60 475.4 (filed Dec. 15, 1999) and 100 11 989.1 (filed Mar. 11, 2000). The disclosure of the above-referenced German patent applications, as well as that of each U.S. and foreign patent and patent application identified in the specification of the present application, are incorporated herein by reference.

BACKGROUND OF THE INVENTION

The invention relates to improvements in methods of and in apparatus for gathering groups (e.g., blockshaped arrays) of commodities and for introducing the thus obtained groups into intermittently advancing receptacles. Examples of equipments which can be operated by resorting to the method and to the apparatus of the present invention are processing machines (such as packing machines) which are employed to mass produce packs of cigarettes or other rod-shaped commodities or products of the tobacco processing industry.

In a modern production line which is designed to turn out cigarette packs, groups or blocks or arrays of parallel rod-shaped articles (hereinafter referred to as cigarettes) are assembled in block forming units the contents of which are thereupon transferred into the receptacles of an intermittently advancing conveyor for delivery to the inlet of the packing machine wherein the groups are confined in envelopes (converted blanks) of metalic foil, paper, cardboard and/or plastic foil. As a rule, the thus obtained packs (e.g., those known as soft packs or hinged-lid packs) are thereupon confined in cartons each of which normally accommodates ten packs, and groups of thus filled cartons are confined in boxes each of which can accommodate, for example, twentyfive cartons and which are delivered to storage or shipped to the purchasers.

Numerous problems arise when the production lines employ plural packing machines or multiple-track packing machines. In either event, a modern packing machine of such character can process large numbers of arrays of properly grouped cigarettes. On the other hand, that part of a production line which gathers cigarettes into groups or arrays of, for example, twenty cigarettes each can turn out the groups at a rate having an upper limit. This is attributable in part to the force of gravity and in part to the presently known best mode of assembling discrete cigarettes into arrays; such mode involves causing cigarettes to descend by gravity sideways in upright or downwardly sloping ducts on their way into the group or block forming units where the cigarettes of an assembled group occupy predetermined positions relative to each other. It is not always advisable to propel the cigarettes sideways with a force exceeding the force of gravity because this could result in damage to (such as defacing of) the cigarettes so that the speed of sidewise downward movement of the cigarettes to the group or block forming units cannot exceed an upper limit. The speed of sidewise downward movement of cigarettes is also affected by friction between the wrappers of the cigarettes and the surfaces of walls which define the ducts. Therefore, a modern high-speed packing machine (especially a multi-track packing machine) cannot operate at full capacity because the group forming station of the production line cannot furnish arrays of cigarettes at the rate at which such arrays can be wrapped into envelopes by the packing machine.

French patent application Serial No. 2.012.136 (published Mar. 13, 1970) discloses an apparatus wherein two block forming units are installed next to each other and each of which can gather groups or arrays of twenty cigarettes each at a frequency which is dictated by the force of gravity and by friction between the wrappers of the cigarettes and the surfaces bounding the ducts wherein the cigarettes descend sideways into the respective block forming units. In other words, the frequency at which the receptacles of the intermittently advancing conveyors, which transport finished groups to the packing machine, receive groups or arrays of twenty cigarettes each is not determined by the maximum possible speed of the conveyor and/or by the capacity of the packing machine but rather solely by the ability of the block forming units to gather successive arrays. Thus, there exists an urgent need for an apparatus (such as a production line) which can be resorted to in order to ensure that the capacity of the packing machine determines the frequency at which groups or arrays of commodities can be wrapped into packets or multiple-layer envelopes of paper, cardboard, metallic foil, plastic foil and/or other suitable wrapping materials.

OBJECTS OF THE INVENTION

An object of the invention is to provide a novel and improved method of gathering groups or arrays or blocks of discrete commodities at a frequency which is determined by the requirements of the processing machine or machines rather than by the gathering or arraying equipment.

Another object of the invention is to provide a novel and improved method of meeting the requirements of modern high-speed (such as multiple-track) packing or other processing machines.

A further object of the invention is to provide a novel and improved method of supplying arrays of plain or filter cigarettes or other rod-shaped products of the tobacco processing industry to twin-track packing machines.

An additional object of the invention is to provide a novel and improved method of and a novel and improved mechanism or apparatus for filling the receptacles of an endless conveyor with arrays of commodities, such as blocks of plain or filter cigarettes, at a rate exceeding that which can be achieved in accordance with heretofore known proposals.

Still another object of the invention is to provide a method which renders it possible to increase the output of a high-speed cigarette packing machine.

A further object of the invention is to provide an apparatus which can supply to one or more consumers arrays of discrete commodities at a rate exceeding that achievable with presently known apparatus.

Another object of the invention is to provide a novel and improved production line for the making of packs containing arrays of discrete commodities, such as block-shaped arrays or groups of rod-shaped products of the tobacco processing industry.

An additional object of the invention is to provide a novel and improved group forming or arraying apparatus for use in conjunction with packing machines for rod-shaped articles of the tobacco processing industry.

Still another object of the present invention is to provide a novel and improved combination of a machine or apparatus for gathering arrays or groups of discrete commodities with a machine which packs or otherwise processes such arrays.

A further object of the invention is to provide a novel and improved apparatus which can meet the requirements of multi-track machines for the processing of arrays of discrete commodities, such as rod-shaped articles of the tobacco processing industry in so-called quincunx and analogous formations.

An additional object of the instant invention is to provide an apparatus which constitutes an improvement over and a further development of those disclosed in the aforementioned published French patent application Serial No. 2.012.136.

SUMMARY OF THE INVENTION

One feature of the present invention resides in the provision of an apparatus for supplying groups or arrays of commodities to a processing machine. The improved apparatus comprises group building means having a plurality of assemblies each including a plurality of group forming units each of which is arranged to gather a succession of groups, and means for transporting groups of commodities from such units to the processing machine.

The processing machine can constitute a packing machine having at least two tracks which are spaced apart from each other by a first distance. The transporting means of such apparatus can comprise a conveyor having a plurality of neighboring receptacles spaced apart from each other by distances each of which at least approximates the first distance. Each such receptacle is arranged to accommodate a group of rod-shaped articles (e.g., plain or filter cigarettes or other rod-shaped articles of the tobacco processing industry). The transporting means of such apparatus can further comprise means for intermittently moving the conveyor by increments each having a length of $m$ second distances ($m$ is the number of tracks in the packing machine).

The group building means of the improved apparatus can include three assemblies, and each such assembly can include two group forming units.

Alternatively, the group building means can comprise two assemblies, and each such assembly can include three group forming units.

If the group building means employs two assemblies and each such assembly includes two group forming units, the units of each assembly are preferably spaced apart from each other by a first distance and the assemblies are spaced apart from each other by a second distance which is twice the first distance.

Each group forming unit can be provided with a fixed outlet (e.g., an outlet in the form of a mouthpiece) for groups of commodities.

The apparatus can further comprise an intermediate storage facility for each of the group forming units; each such facility is or can be movable between a first position for reception of a group of commodities from the respective unit and a second position for transfer of a group of commodities to the transporting means. At least one of the intermediate storage facilities can be installed in such a way that it is movable at least substantially vertically between its first and second positions. Alternatively, at least one of the intermediate storage facilities can be installed in such a way that it is movable at least substantially horizontally between its first and second positions.

If each of the group forming units is provided with a fixed outlet for successive groups of commodities, the improved apparatus can further comprise the aforementioned intermediate storage facility for each group forming unit and means for moving such facilities between first positions for reception of groups of commodities from the respective outlets and second positions best suited for transfer of groups or arrays or blocks of commodities to the transporting means. All of the aforementioned moving means are or can be at least substantially identical.

Another feature of the present invention resides in the provision of a method of supplying a processing machine with groups of commodities. The improved method comprises the steps of establishing a plurality of group building stations with at least two group forming units per station, repeatedly gathering groups of commodities in the group forming units of such group building stations, converting the groups which are assembled by the group forming units into a series of groups in a path leading to the processing machine, and stepwise transporting the groups of the series along such path to the processing machine.

The processing machine can constitute or include a multi-track packing machine for rod-shaped commodities of the tobacco processing industry. The tracks of such packing machine are or can be spaced apart from each other by a first distance, and the transporting step can include advancing the groups of the series through second distances $m$ times a first distance ($m$ is the number of tracks in the packing machine).

The converting step can include simultaneously transferring into the path assembled groups of commodities from all of the group forming units of all of the group building stations.

Alternatively, the converting step can include simultaneously transferring, from one station at a time, into the path all of the groups assembled at the respective station.

Still further, the converting step can include simultaneously transferring all of the groups which are built at the group building stations.

It is also possible to select the converting step in such a way that it includes delivering to the path groups of commodities subsequent to completion of pairs of successive stepwise transports of groups along the path.

Still further, it is possible to select the converting step in such a way that it includes transferring groups of commodities from one station at a time in accordance with a predetermined pattern, e.g., first from one station, thereupon from another of two stations, thereupon from the one station, thereupon from the other station, and so forth.

The number of stations can equal two, and each station can comprise three group forming units.

Alternatively, the number of stations can equal three and each station can comprise two group forming units.

The converting step can include expelling groups of commodities through stationary mouthpieces of the group forming units into discrete mobile storage facilities, and thereupon transporting the storage facilities from the respective mouthpieces to the aforementioned path.

The packing machine can constitute an updated version of the packing machine known as COMPAS 500 packer.

The novel features which are considered as characteristic of the invention are set forth in particular in the appended claims. The improved apparatus itself, however, both as to its constriction and the modes of assembling and operating the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
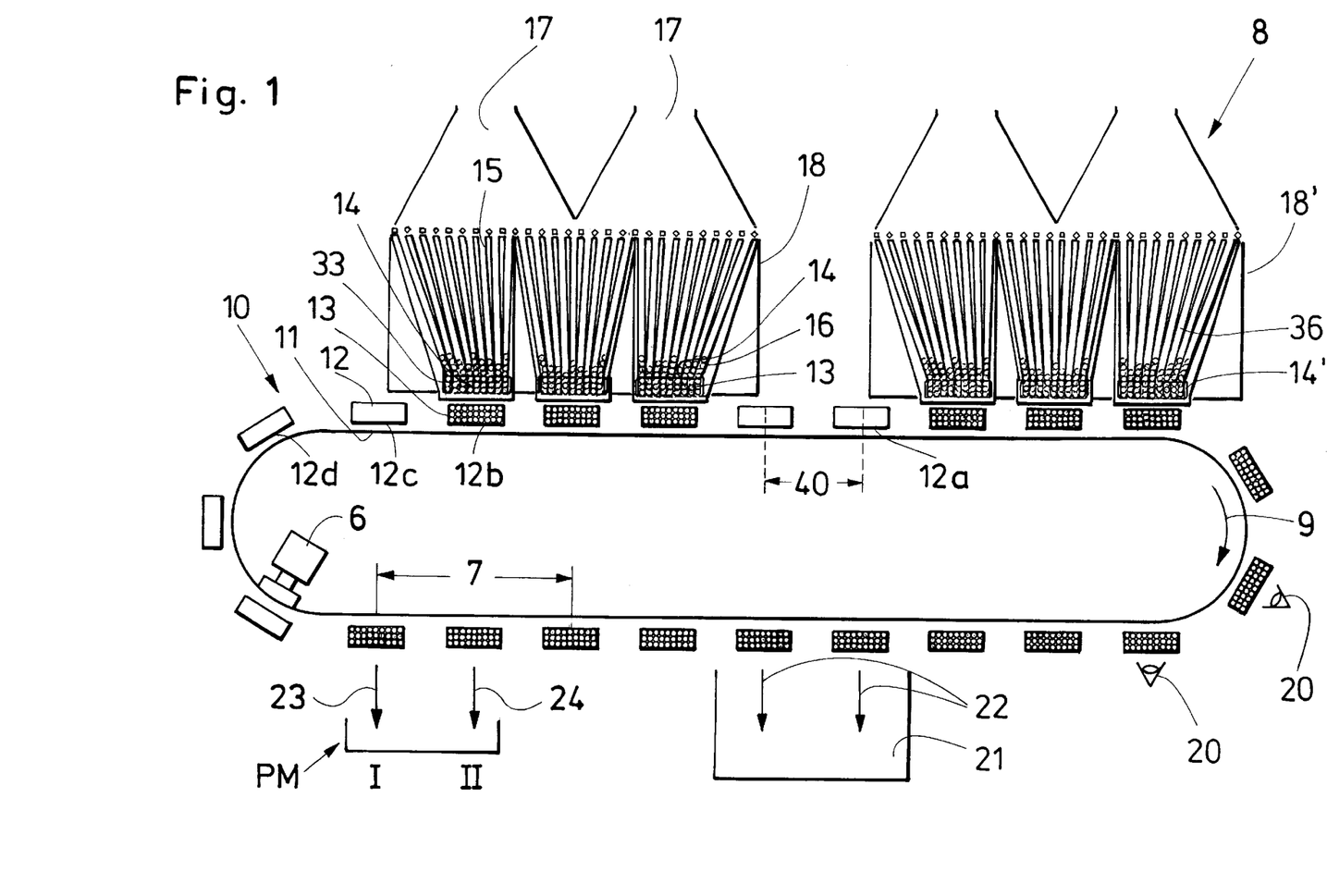
FIG. 1 is a schematic front elevational view of an apparatus which is designed to gather arrays of rod-shaped articles in accordance with a first embodiment of the invention and is set up to supply such arrays to a twin-track packing machine.

FIG. 1 illustrates a portion of a production line which includes a multiple-track processing or packing machine PM and a novel apparatus which is designed to supply groups or blocks or arrays 13 of discrete commodities 16 to the two tracks (wrapping lines) of the packing machine. The commodities 16 are rod-shaped products (such as plain or filter cigarettes) of the tobacco processing industry, and each group or array or block 13 (hereinafter called group) contains three superimposed layers of nine discrete rod-shaped products (hereinafter called cigarettes) each.

The improved apparatus comprises a transporting unit 10 including an endless belt or chain conveyor 11 which carries a series of equidistant receptacles or pockets 12, and each such pocket is dimensioned to temporarily receive and confine a group of twentyseven cigarettes 16. The conveyor 11 is arranged to advance, stepwise, in the direction indicated by arrow 9 so that successive pockets 12 advance first toward, past and beyond a group forming location 8 (located at a level above the conveyor 11, as viewed in FIG. 1), thereupon toward, past and beyond an ejecting or expelling station 21 (wherein defective groups 13 are expelled from their pockets 12 in the direction indicated by arrows 22), and thereupon toward, past and beyond the inlet of the packing machine PM.

The conveyor 11 is driven stepwise by a suitable motor 6 so that it advances by increments 7 each having a length twice the distance 40 between the centers of two neighboring pockets 12. This ensures that each incremental advance of the conveyor 11 results in a movement of two foremost filled pockets 12 to positions of alignment with the inlets of the tracks I, II of the packing machine PM. Such foremost groups are thereupon transferred into the respective tracks I, II in directions indicated by the arrows 23, 24 by implements or robots or other suitable devices not forming part of the present invention. For example, such devices can include one or more pushers of the type shown (at 35) in the lower part of FIG. 5.

The illustrated location 8 provides room for two group building stations which respectively accommodate two assemblies 18, 18' of three preferably identical group forming units 14 and 14', respectively. Each of these units is designed to build or form or assemble a group 13 of twentyseven cigarettes 16 in a manner similar or analogous to that disclosed, for example, in commonly owned U.S. Pat. No. 4,471,866 granted Sep. 18, 1984 to Erdmann et al. for "APPARATUS FOR ASSEMBLING ARRAYS OF CIGARETTES IN PACKING MACHINES". A packing machine which embodies a structure of the type disclosed in the '866 patent to Erdmann et al. is known as COMPAS 500 and is distributed by the assignee of the present application.

Each of the group forming units 14, 14' comprises nine upright or nearly upright ducts 15 for sidewise gravitational descent of cigarettes 16 from one or more magazines 17 (FIG. 1 shows that each of the assemblies 18, 18' comprises two magazines 17 and that each of these magazines supplies cigarettes 16 to one of the outer group forming units 14 or 14' and to a portion of the median group forming unit 14 or 14'). It is also possible to employ a single magazine for each of the assemblies 18, 18' (such arrangement is resorted to in or with many types of the COMPAS 500 packing machines) The magazines 17 can receive cigarettes 16 from suitable makers. For example, each such magazine can receive plain cigarettes from a maker known as PROTOS (distributed by the assignee of the present application) and similar or analogous to that described in U.S. Pat. No. 4,281,670 granted Aug. 4, 1981 to Heitmann et al. for "APPARATUS FOR INCREASING THE PERMEABILITY OF WRAPPING MATERIAL FOR ROD-SHAPED SMOKERS' PRODUCTS". Alternatively, the magazines 17 can receive filter cigarettes from a maker (also called tipping machine) known as MAX which is distributed by the assignee of the present application and is described, for example, in commonly owned U.S. Pat. No. 5,135,008 granted Aug. 4, 1992 to Oesterling et al. for "METHOD OF AND APPARATUS FOR MAKING FILTER CIGARETTES". The MAX machine can receive plain cigarettes from a PROTOS machine.

Cigarettes 16 descend by gravity from the magazines 17 in the ducts 15 along vertical or substantially vertical (downwardly sloping) paths 36 into the respective group forming units 14 and 14' to gather into groups 13 which are ready for direct admission into the then registering empty pockets 12 of the conveyor 11 or into intermediate storage facilities 33. The storage facilities 33 can constitute or include containers which are movable between an upper level for reception of arrays 13 from the respective group forming units 14 or 14' and a lower level at which they are in optimum positions for the transfer of their contents (groups 13) into the then registering empty pockets 12.

FIG. 1 further shows two sensors 20 which monitor the contents of successive filled (or presumably filled) pockets 12 downstream of the second assembly 18' and upstream of the ejecting station 21 to ascertain one or more characteristics of the adjacent groups 13 during the intervals between successive intermittent advancements of the conveyor 11 in the direction of arrow 9. For example, the sensors 20 can ascertain the number of cigarettes 16 in the adjacent groups 13 as well as the extent to which the cigarettes of the adjacent groups are filled with tobacco particles. Signals from the sensors 20 serve to initiate expulsion of defective groups 13 at the ejecting station 21 (in the direction indicated by the arrows 22). The ejected cigarettes 16 can be opened up to recover the tobacco particles which are returned into the hopper of the cigarette maker. An apparatus which can test plain or filter cigarettes for the presence of one or more defects is disclosed, for example, in commonly owned U.S. Pat. No. 4,901,860 granted Feb. 20, 1990 to Wahle et al. for "APPARATUS FOR TESTING AND CLASSIFYING CIGARETTES OR THE LIKE".

Apparatus which can deliver plain or filter cigarettes to the magazines 17 can be of the type disclosed in U.S. Pat. No. 4,339,026 granted Jul. 13, 1982 to Base et al. for "APPARATUS FOR DELIVERING CIGARETTES OR THE LIKE FROM A MAKER TO A CONSUMING MACHINE", or in commonly owned U.S. Pat. No. 5,472,078 granted Dec. 5, 1995 to Hoffmann et al. for "METHOD OF AND APPARATUS FOR CONVERTING A SINGLE LAYER OF ROD-SHAPED ARTICLES INTO A MASS FLOW".

Satisfactory groups 13 are permitted to advance beyond the ejecting station 21 and to reach the packing machine PM. The two tracks I and II of the machine PM can receive satisfactory groups 13 simultaneously or seriatim. The directions of transfer of satisfactory groups 13 into the tracks I and II are respectively indicated by the arrows 23, 24. The thus emptied pockets 12 are thereupon advanced back toward the first assembly 18. The motor 6 for moving the conveyor 11 stepwise, always through increments equaling two distances 40, can comprise or constitute a suitable stepping motor. The distance 40 between the centers of any two neighboring pockets 12 matches the distance between the centers of the tracks I and II in the packing machine PM.

The mode of operation of the production line including the packing machine PM, the transporting unit 10 and the assemblies 18, 18' is as follows:

It is assumed that the conveyor 11 of the transporting unit 10 is idle and that the pockets 12 of the conveyor 11 are empty. The magazines 17 of the two assemblies 18, 18' are assumed to contain supplies of parallel cigarettes 16 (extending at right angles to the plane of FIG. 1) and each of the group forming units 14, 14' is assumed to contain a group or array or block 13 of twentyseven cigarettes 16 in three superimposed layers or strata of nine cigarettes each.

The first step involves the (direct or indirect (via intermediate storage facilities 33)) transfer of three groups 13 from the group forming units 14 of the assembly 18 into the adjacent (then stationary) pockets 12. The motor 6 is thereupon caused to advance the conveyor 11 by an increment 7 so that the foremost one of the three freshly filled pockets 12 occupies the position occupied in FIG. 1 by the empty pocket 12a. The units 14 of the assembly 18 can begin to gather three fresh groups 13 (above the filled pocket 12b and the immediately following empty pockets 12c, 12d) as soon as the emptying of the units 14 is completed, and such filling can continue during the following evacuation of the contents of the three units 14' of the assembly 18' into the pockets 12 therebelow. Thus, six consecutive pockets 12 of the conveyor 11 are then filled with groups 13 of cigarettes 16.

The next step involves advancement of the conveyor 11 by an increment 7 and the immediately following step involves a transfer of three groups 13 from the units 14 into the adjacent empty pockets 12 so that the thus filled pockets are separated from the preceding filled pockets by three empty pockets. A further step by another increment 7 results in the placing of three empty pockets 14 beneath the three units 14, and the contents of such three units 14 are transferred into the empty pockets 12 below them, and so forth.

It will be seen that the intervals which are available for the simultaneous gathering of three groups 13 each in the units 14 of the assembly 18 as well as in the units 14' of the assembly 18' are much longer than in the apparatus of the aforediscussed published French patent application Serial No. 2.012.136 because each such interval includes at least one period of dwell and at least one period of advancement of the conveyor 11. This greatly increases the likelihood that each of the groups 13 will contain a prescribed number of cigarettes 16 as well as that each such group will contain the requisite number of cigarettes in optimum positions relative to each other. Therefore, the number of rejects which must be evacuated at the ejecting station 21 is much lower than in conventional production lines even though the output of the devices at the group forming location 8 is highly satisfactory. All this is attributable to the provision of plural block building assemblies (18, 18'), to the provision of the distance (2×40) between these assemblies, the provision of several units (14, 14') per assembly, and the feature that the transfer of three groups 13 from the unit 14 of the assembly 18 need not take place simultaneously with the transfer of three groups 13 from the units 14' of the assembly 18' into the adjacent empty pockets 12.

Otherwise stated, the improved method and apparatus render it possible to operate the multiple-track packing machine PM at full capacity because, even though the intervals for the assembling or building of the groups 13 are long, this does not necessitate a slowing down of the delivery of pairs of freshly assembled groups 13 to the tracks I and II of the packing machine PM.

Figure 2:
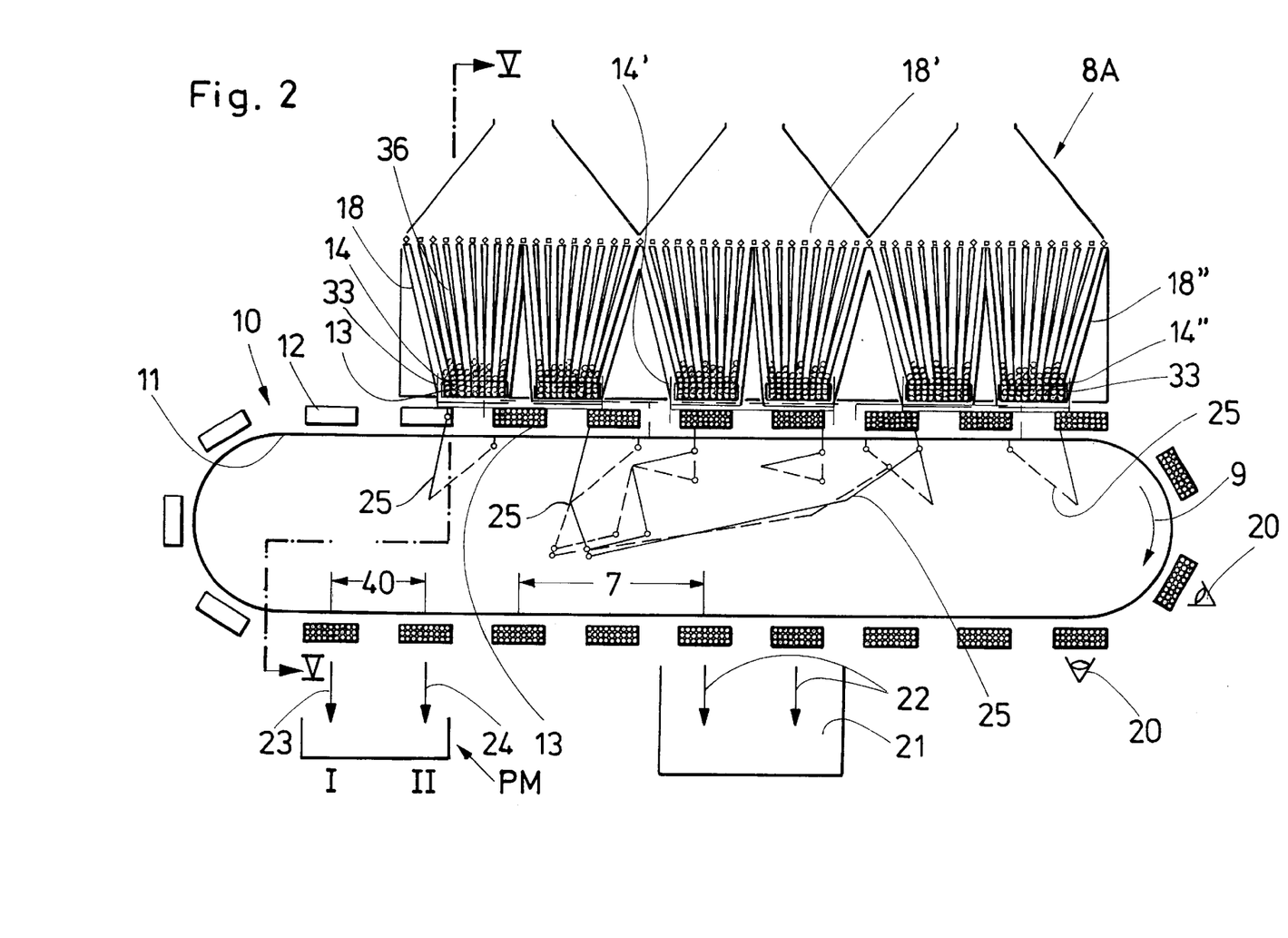
FIG. 2 is a similar schematic front elevational view of an apparatus constituting a first modification of the apparatus which is shown in FIG. 1.
Figure 3:
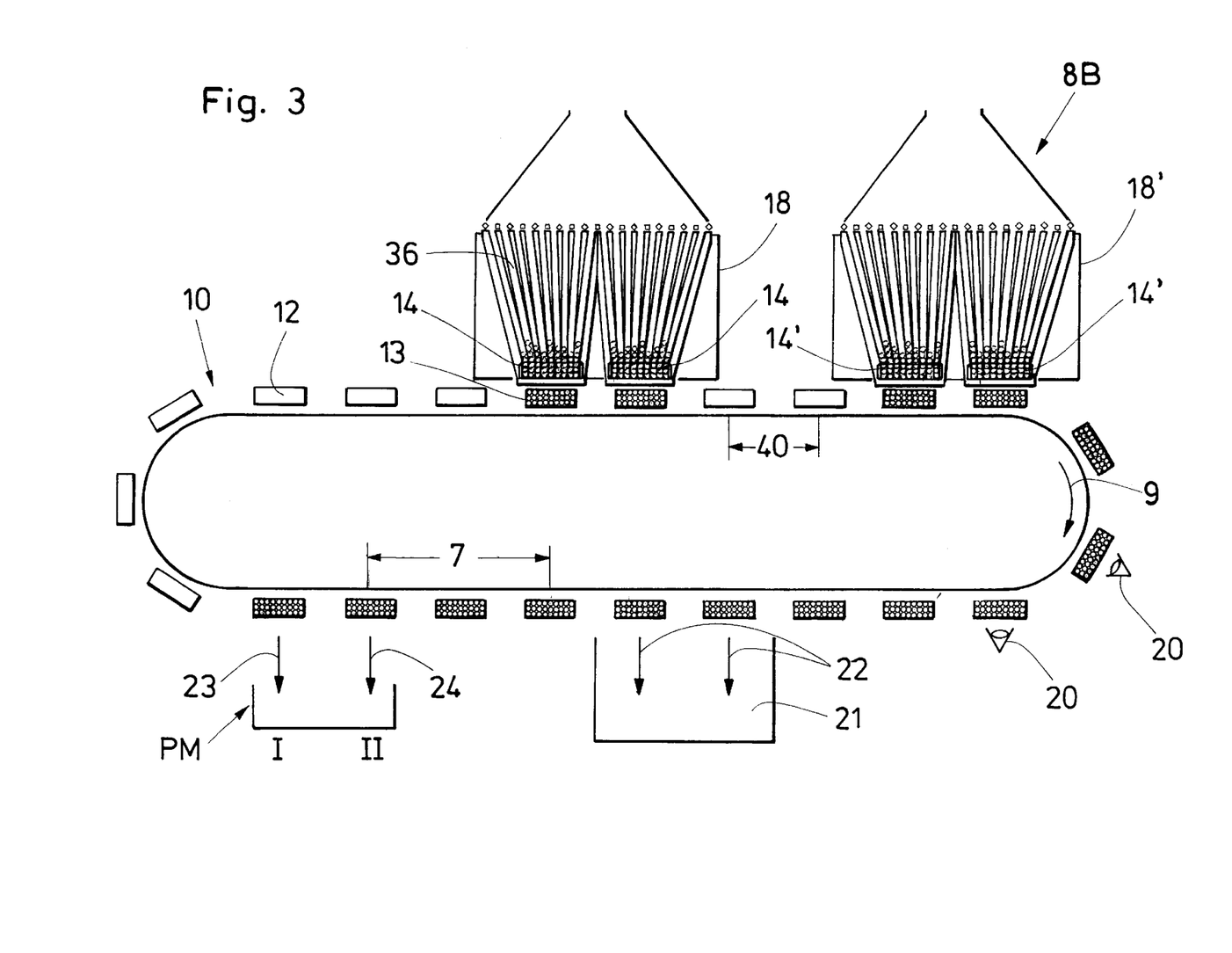
FIG. 3 is a similar view of a third apparatus.
Figure 4:
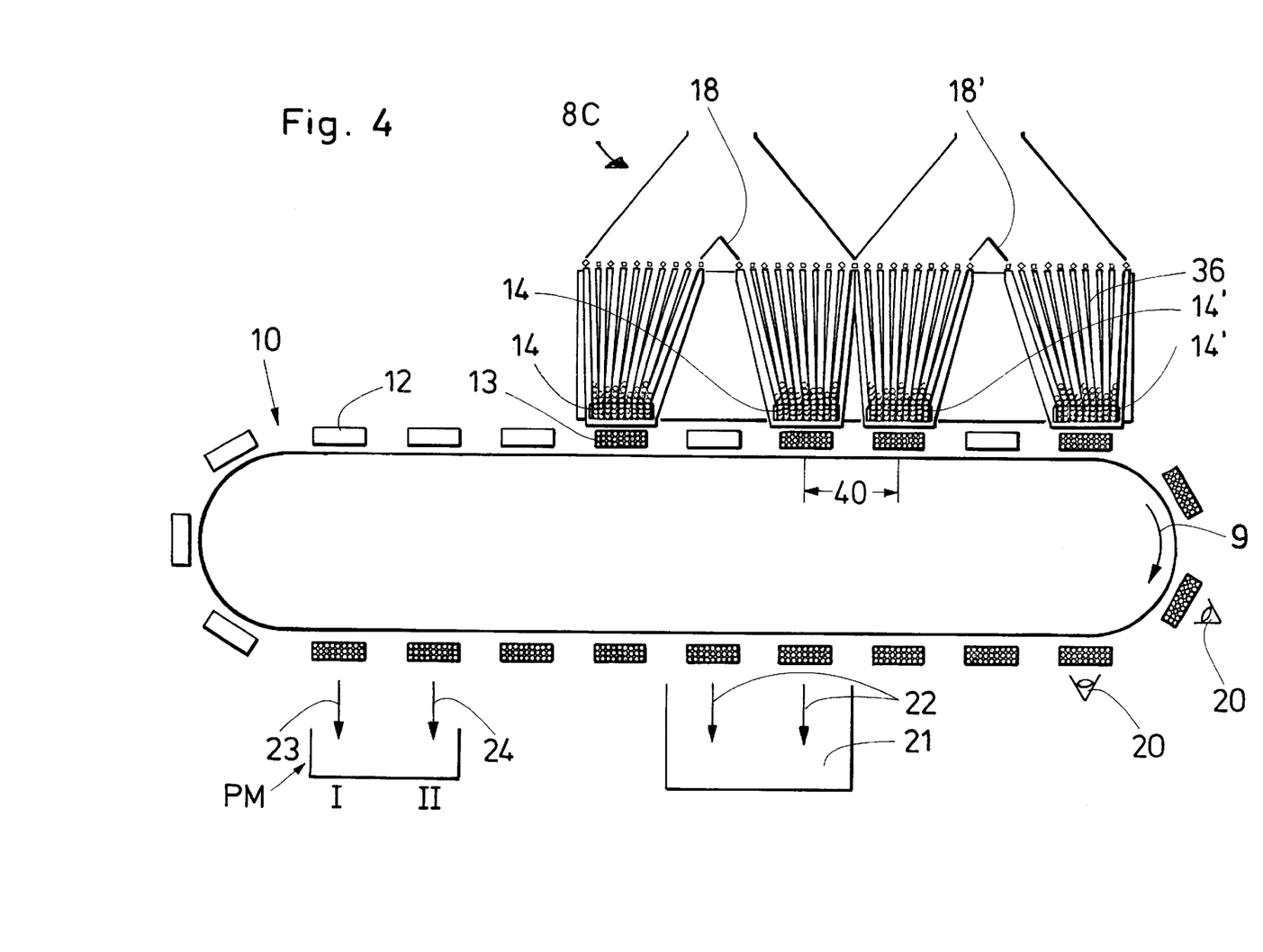
FIG. 4 is a similar view of a fourth apparatus.

FIG. 2 illustrates certain relevant parts, units and assemblies of a modified production line. All such constituents of this production line which are identical with or clearly analogous to the corresponding constituents of the production line of FIG. 1 are denoted by similar reference characters. This also applies for the embodiments which are illustrated in FIGS. 3 and 4.

The group forming location 8A of FIG. 2 comprises a series of three successive equidistant neighboring group building assemblies 18, 18', 18" each of which comprises only two group forming units 14, 14', 14", respectively. The production line of FIG. 2 further employs transfer units 25 which are designed to move groups 13 of cigarettes 16 from the group forming units 14, 14', 14" into the then adjacent or registering or properly positioned empty receptacles or pockets 12 of the conveyor 11. Each transfer unit 25 includes an intermediate storage facility 33 which can assume a first position for reception of groups 13 from the fixed mouthpieces or outlets 30 (see FIG. 5) of the respective units 14, 14', 14" and a second position (shown in the lower part of FIG. 5) for the transfer of such groups into the adjacent empty pockets 12.

Figure 5:
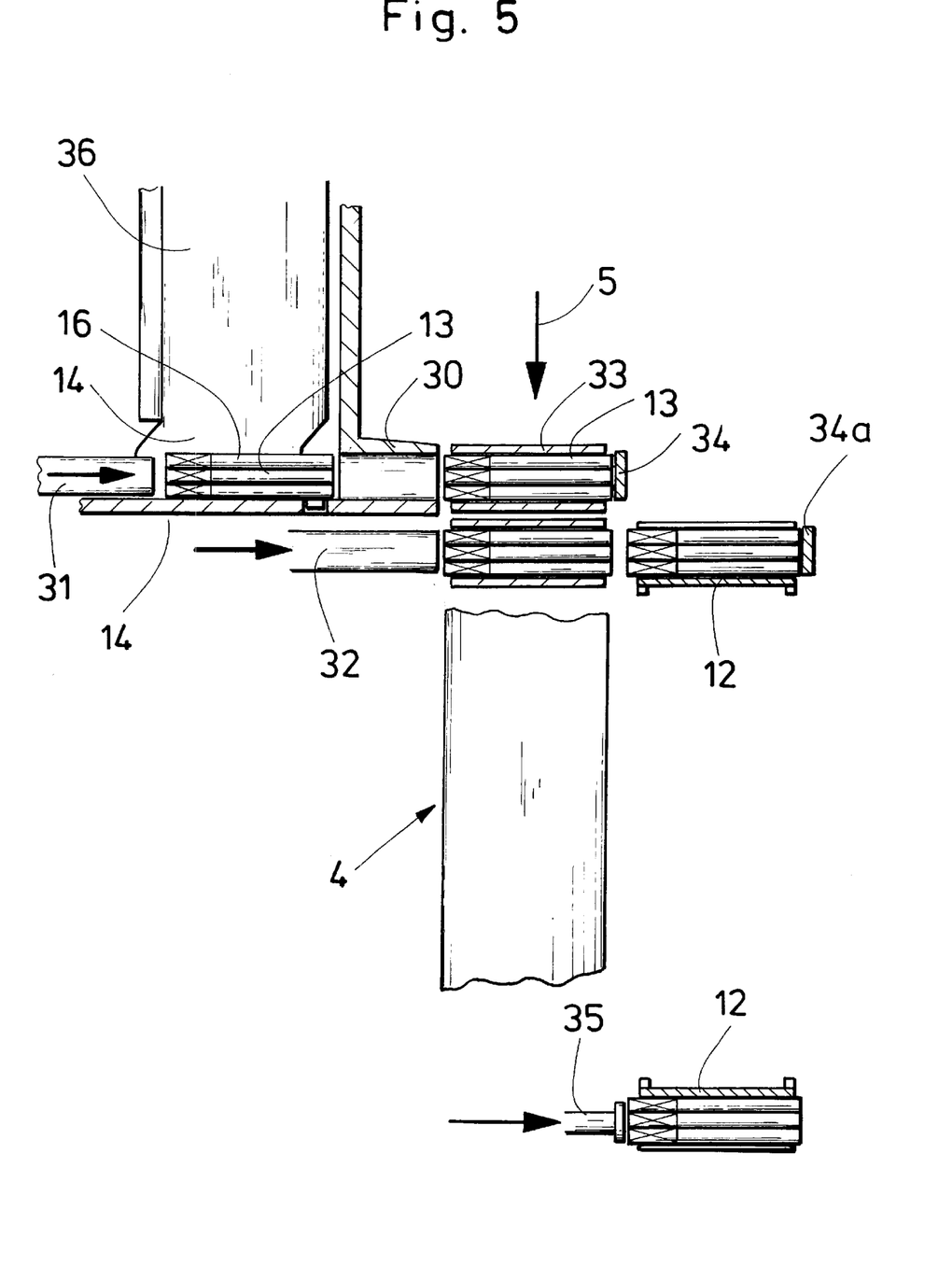
FIG. 5 is an enlarged fragmentary sectional view substantially as seen in the direction of arrows from the line V—V in FIG. 2.

The details of one of the transfer units 25 are shown in FIG. 5. The group forming unit 14 of FIG. 5 has the aforementioned fixed outlet or mouthpiece 30 which serves to guide the cigarettes 16 of an assembled or formed group 13 which is being expelled from the respective unit 14 by a first pusher 31. Such group 13 enters the respective intermediate storage facility 33 which is adjacent an abutment or stop 34 serving as a means for properly aligning the cigarettes 16 of the freshly transferred group 13. The facility 33 is movable (e.g., vertically in and counter to the direction indicated by the arrow 5) between the (upper) level of the outlet 30 of the respective unit 14 and the (lower) level of the adjacent empty pocket 12. A second pusher 32 is provided to transfer the array 13 from the (lowered) storage facility 33 into the adjacent empty pocket 12 against a second stop 32a. The pusher 35 which is shown in the lower right-hand portion of FIG. 5 is provided at the inlet of the packing machine PM to expel groups 13 from their pockets 12 into the track I or II.

The transfer units 25 are employed when the space which is available at the group forming location 8A is such that the individual group forming units 14, 14', 14" cannot be installed directly above the path for the pockets 12 being borne by the upper reach or stretch of the conveyor 11.

In FIG. 2, the positions of the intermediate storage facilities 33 at the (upper) levels of the respective outlets 30 are indicated by solid lines and the positions of such storage facilities at the (lower) levels of the pockets 12 are denoted by broken lines. When in their lower end positions, the storage facilities 33 can be located in front of or behind the adjacent pockets 12, depending upon the nature of the space which is available for such storage facilities and for the pushers 31, 32 at the group forming units 14, 14' and/or 14".

The mode of operation of the production line including the structures shown in FIGS. 2 and 5 is as follows:

It is again assumed that the pockets 12 of the conveyor 11 are empty and that each of the group forming units 14, 14', 14" contains a fully grown or a growing (incipient) group 13. The motor 6 (not shown in FIG. 2) for the conveyor 11 is set to advance the conveyor 11 through increments 7 matching the distances between the centers of the first, third, fifth, etc. pockets 12, i.e., the same as in FIG. 1. Each such increment 7 equals twice the distance 40 between the centers of the tracks I, II of the packing machine PM.

The first step involves simultaneous transfer of pairs of groups 13 from each of the three assemblies 18, 18', 18" into the adjacent or allocated pockets 12 by way of the respective transfer units 25. This results in simultaneous filling of six neighboring pockets 12. The next steps involve three successive stepwise advances of the conveyor 11 in the direction of arrow 9 to thus move successive foremost pairs of groups 13 into positions for transfer into the tracks I and II of the packing machine PM. In the meantime, the group forming units 14, 14', 14" jointly (simultaneously) accumulate six fresh groups 13 which are thereupon transferred into the six empty pockets 12 immediately following the six filled pockets of the conveyor 11. It will be seen that the production line including the structure of FIGS. 2 and 5 establishes even longer intervals of time for the gathering of fresh groups 13 so that the likelihood of the formation of unsatisfactory groups (due to the influence of gravity and/or friction between the wrappers of the cigarettes 16 and the surfaces bounding the ducts 15) is even more remote.

FIG. 5 shows that the improved apparatus including the structure at the group forming location 8A and the transporting unit 10 has means 31, 32, 35 for moving groups 13 horizontally between first and second positions, as well as means (note the schematically indicated elevator 4) for moving groups 13 vertically or substantially vertically between upper and lower levels, i.e., between the outlets 30 of the group forming units 14, 14', 14" and the level of the properly positioned empty pockets 12.

The pushers 31, 32, 35, the outlets 30, the storage facilities 33 and/or the pockets 12 can further serve as a means for at least slightly compressing or compacting and thus shaping the groups 13 of cigarettes 16.

In FIG. 1, the length of successive advances of pockets 12 between successive deliveries of groups 13 thereto equals m wherein m is a whole number matching the number of tracks I, II of the packing machine PM.

The total number of units 13 in the apparatus of the present invention can equal m×n wherein each of m and n is a whole number equal to or greater than two. In FIG. 2, m (i.e., the number of assemblies 18, 18', 18") equals three, and n (i.e., the number of group forming units 14, 14', 14" in each assembly) equals two. In FIG. 1, m equals two and n equals three.

An advantage of the apparatus of FIG. 2 is that, since all of the six simultaneously assembled groups 13 can be expelled from the respective units 14, 14', 14" in a single step, and all of the thus simultaneously expelled groups 13 can be introduced into the then aligned empty pockets 12 in a single step, the number of pushers 31, 32, 35 can be reduced to a minimum (i.e., one pusher 31, one pusher 32 and one pusher 35).

Furthermore, and as already mentioned above, the apparatus of FIG. 2 provides for very long intervals of time which are available for the simultaneous building or assembling of six groups 13 in the three pairs of group forming units 14, 14', 14". The three steps of forward movement of the conveyor 11 between successive transfers of freshly gathered groups 13 into empty pockets 12 can be carried out as rapidly as is permissible for the transfer of pairs of groups 13 into the packing machine PM during each interval of dwell of the conveyor 11.

The production line including the structure of FIG. 3 comprises a group forming location 8B for two array or block or group forming assemblies 18, 18' each of which includes two group forming units 14, 14'. In this embodiment, the building or assembling of groups 13 can take place during intervals each of which includes one stepwise advancement of the conveyor 11 along its endless path. The distance between the right-hand group forming unit 14 and the left-hand group forming unit 14' equals three distances 40, and the length of incremental advances (7) is the same as in the embodiments of FIGS. 1 and 2. The units 14, 14' discharge their contents (i.e., freshly formed groups 13) simultaneously after each second incremental advance of the pockets 12. However, it is equally possible to operate the structure of FIG. 3 in such a way that the units 14 discharge the freshly formed groups 13 after a first step, the units 14' discharge after the next-following second step, the units 14 discharge after the next-following third step, the units 14' discharge after the next-following fourth step, and so forth.

The distance between the tracks I and II of the packing machine PM again equals the distance 40, i.e., the distance between neighboring group forming units 14 or 14'. In all other respects, the production line embodying the structure of FIG. 3 can be constructed and operated in a manner as described with reference to FIG. 1 or 2, i.e., the units 14, 14' shown in FIG. 3 can discharge freshly formed groups 13 directly into the then adjacent empty pockets 12 or into intermediate storage facilities 33 (not shown in FIG. 3).

The group forming location 8C in the production line including the structure shown in FIG. 4 accommodates two array or block or group building assemblies 18, 18' which are constructed and assembled in such a way that the two group forming units 14, as well as the two group forming units 14', are spaced apart from each other by distances 2×40 but that the right-hand unit 14 and the left-hand unit 14' are spaced from each other by a distance 40. The distance 40 equals that between the centers of the tracks I and II of the packing machine PM.

The operation of the production line including the structure shown in FIG. 4 is such that the group forming units 14 discharge their contents (groups 13) after the conveyor 11 completes a first step, the units 14' discharge their contents (groups 13) after the conveyor 11 completes the next (second) step, that the units 14 discharge their contents after the conveyor 11 completes the third step, and so on. Thus, the assembling of the groups 13 can take up relatively long periods of time because each such period covers an interval of dwell and two periods of advancement of the conveyor 11. The transfer of groups 13 from the group forming units 14, 14' into the (then) adjacent empty pockets 12 can take place directly (as described with reference to FIG. 1) or indirectly (e.g., by way of intermediate storage facilities 33 and transfer units 25 as described with reference to FIGS. 2 and 5).

It is also possible to operate the production line including the structure of FIG. 4 in such a way that the group forming units 14, 14' discharge freshly assembled groups 13 simultaneously after each second stepwise advance of the conveyor 11.

As a rule, or at least in many instances, the term "array" or "block" or "group" (as utilized in this specification and in the appended claims) is intended to denote an assembly of cigarettes or other types of commodities which are caused to assume predetermined positions relative to each other. For example, in lieu of the aforementioned formations each of which includes three layers of nine cigarettes each, it is equally possible to assemble plain or filter cigarettes or other types of rod-shaped articles in so-called quincunx formations wherein two outer layers of, for example, seven articles each flank a median layer of six articles which are staggered relative to the articles of the outer layers. Still further, the articles need not necessarily be rods because the method and the apparatus of the present invention can be put to use, with equal or similar advantage, in connection with the conveying and/or other processing or treatments which necessitate retention of articles or other commodities in receptacles corresponding to those of the units 14, 14' and/or 14" for intervals of time at least slightly longer than the shortest possible interval of gathering a certain number or quantity (e.g., by weight) of commodities in a receptacle or the like.

An advantage of each embodiment of the improved method and apparatus is that the number of groups 13 which are delivered to the conveyor 11 per unit of time is greater than in heretofore known apparatus, and this is achieved without unduly shortening the intervals which are taken up for the gathering of groups 13. The reason is that the gathering of groups 13 takes place in at least two assemblies (such as 18, 18', 18") each of which comprises at least two group forming units (such as 14, 14', 14").

Stated differently, the frequency of transfers of groups 13 to the conveyor 11 is higher than the frequency or time of gathering of successive groups 13 in the units 14, 14' or 14, 14', 14".

The lengths of successive steps carried out by the conveyor 11 are or can be m+1 (wherein m is a whole number matching the number of tracks (I, II) in the packing machine PM.

U.S. Pat. No. 5,718,102 (granted Feb. 17, 1998 to Draghetti for "METHOD AND DEVICE FOR FORMING AND TRANSFERRING GROUPS OF CIGARETTES ON A PACKING MACHINE WITH MULTIPLE WRAPPING LINES") discloses an apparatus which is designed to gather pairs of groups or arrays of twenty cigarettes each in the pockets of an intermittently advancing endless conveyor serving to deliver successive pairs of fully grown arrays to two tracks (called wrapping lines) of a packing machine. A drawback of such proposal is that the layers of cigarettes of each array must be repeatedly shifted relative to each other with attendant pronounced likelihood of defacing of and/or other damage to the cigarettes. Moreover, the mechanism which serves to transfer discrete layers of cigarettes into the pockets of the intermittently advancing conveyor is complex and bulky; in fact, such mechanism can take up more space than the mechanism which gathers layers of cigarettes next to one side of the path for the pockets of the intermittently advancing conveyor.

Additional apparatus which are designed to gather cigarettes or the like into arrays ready for admission into a packing machine are disclosed in U.S. Pat. No. 3,278,077 (granted Oct. 11, 1966 to Schmermund for "DEVICE FOR HANDLING ELONGATED ARTICLES"), U.S. Pat. No. 4,735,032 (granted Apr. 5, 1988 to Focke for "APPARATUS FOR CONVEYING CIGARETTE GROUPS"), and U.S. Pat. No. 5,617,943 (granted Apr. 8, 1997 to Belvederi et al. for "GROUP FORMING DEVICE FOR CIGARETTE PACKING MACHINES".

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of packing cigarettes and the like and, therefore, such adaptations should and are intended to be comprehended within the meaning and range of equivalence of the appended claims.

What is claimed is:

1. Apparatus for supplying groups of commodities to a processing machine, comprising:

group building means having a plurality of assemblies each including a plurality of group forming units each arranged to gather a succession of groups;

means for transporting groups from said units to the processing machine;

the processing machine being a packing machine having at least two tracks spaced apart from each other by a first distance, said transporting means comprising a conveyor having a plurality of neighboring receptacles spaced apart from each other by identical second distances each of which at least approximates said first distance, each of said receptacles being arranged to accommodate a group of rod-shaped articles;

said transporting means further comprises means for intermittently moving said conveyor by increments each having a length of m second distances, m being the number, of tracks in the packing machine, each group forming means gathering an entire group of rod-shaped articles and transferring the entire group into a receptacle while said conveyor is stopped at a position between incremental movements.

2. The apparatus of claim 1, wherein said group building means has three assemblies and each of said assemblies includes two group forming units.

3. The apparatus of claim 1, wherein said group building means has two assemblies and each of said assemblies includes three group forming units.

4. The apparatus of claim 1, wherein each of said units has a fixed outlet for groups of commodities.

5. Apparatus for supplying groups of commodities to a processing machine, comprising:

group building means having a plurality of assemblies each including a plurality of group forming units each arranged to gather a succession of groups; and means for transporting groups from said units to the processing machine; wherein said group building means has two assemblies and each of said assemblies includes two group forming units, the units of each assembly being spaced apart from each other by a first distance and said assemblies being spaced apart from each other by a second distance twice said first distance.

6. Apparatus for supplying groups of commodities to a processing machine, comprising:

group building means having a plurality of assemblies each including a plurality of group forming units each arranged to gather a succession of groups;

means for transporting groups from said units to the processing machine; and an intermediate storage facility for each of said units, each of said facilities being movable between a first position for reception of a group of commodities from the respective unit and a second position for transfer of a group to said transporting means.

7. The apparatus of claim 6, wherein at least one of said intermediate storage facilities is movable at least substantially vertically between said first and second positions thereof.

8. The apparatus of claim 6, wherein at least one of said intermediate storage facilities is movable at least substantially horizontally between said first and second positions thereof.

9. Apparatus for supplying groups of commodities to a processing machine, comprising:

group building means having a plurality of assemblies each including a plurality of group forming units each arranged to gather a succession of groups; and means for transporting groups from said units to the processing machine, wherein each of said units has a fixed outlet for discrete groups of commodities, and further comprising an intermediate storage facility for each of said units and means for moving the facilities between a first position for reception of a group from the respective outlet and a second position for transfer of a group to said transporting means.

10. The apparatus of claim 9, wherein all of said moving means are at least substantially identical.

11. A method of providing a processing machine with groups of commodities, comprising the steps of:

establishing a plurality of group building stations with at least two group forming units per station;

repeatedly gathering groups of commodities in the group forming units of the group building stations;

converting the groups assembled by the group forming units into a series of groups in a path leading to the processing machine;

stepwise transporting the groups of the series along the path to the processing machine;

the processing machine being a multiple-track packing machine for rod-shaped commodities of the tobacco processing industry; and the tracks of the packing machine being spaced apart from each other by a first distance and said transporting step including advancing the groups of the series through second distances $\underline{m}$ times a first distance wherein $\underline{m}$ is the number of tracks in the packing machine.

12. The method of claim 11, wherein said converting step includes simultaneously transferring into the path assembled groups of commodities from all of the units of all the group building stations.

13. The method of claim 11, wherein said converting step includes simultaneously transferring, from one station at a time, into said path all of the groups assembled at the respective station.

14. The method of claim 11, wherein said converting step includes simultaneously transferring all of the groups built at the group building stations.

15. The method of claim 11, wherein said converting step includes delivering to the path groups of commodities subsequent to completion of pairs of successive stepwise transports of groups along the path.

16. The method of claim 11, wherein said converting step includes simultaneously transferring groups of commodities from one station at a time in accordance with a predetermined pattern.

17. A method of providing a processing machine with groups of commodities, comprising the steps of:

establishing a plurality of group building stations with at least two group forming units per station;

repeatedly gathering groups of commodities in the group forming units of the group building stations;

converting the groups assembled by the group forming units into a series of groups in a path leading to the processing machine; and stepwise transporting the groups of the series along the path to the processing machine wherein the number of stations equals two and each station comprises three group forming units.

18. A method of providing a processing machine with groups of commodities, comprising the steps of:

establishing a plurality of group building stations with at least two group forming units per station;

repeatedly gathering groups of commodities in the group forming units of the group building stations;

converting the groups assembled by the group forming units into a series of groups in a path leading to the processing machine; and stepwise transporting the groups of the series along the path to the processing machine wherein the number of stations equals three and each station comprises two group forming units.

19. A method of providing a processing machine with groups of commodities, comprising the steps of:

establishing a plurality group building stations with at least two group forming units per station;

repeatedly gathering groups of commodities in the group forming units of the group building stations;

converting the groups assembled by the group forming units into a series of groups in a path leading to the processing machine; and stepwise transporting the groups of the series along the path of processing machine wherein said converting step includes expelling groups of commodities through stationary mouthpieces of the group forming units into discrete mobile storage facilities and thereupon transporting the storage facilities from the respective mouthpieces to the path.

* * * * *

UNITED STATES PATENT AND TRADEMARK OFFICE
CERTIFICATE OF CORRECTION

PATENT NO.     : 6,385,947 B2
DATED          : May 14, 2002
INVENTOR(S)    : Hartmut Meis It is certified that error appears in the above-identified patent and that said Letters Patent is hereby corrected as shown below:

<u>Title page,</u>
Item [73], should read:
-- [73]  Assignee: Topack Verpackungstechnik GmbH, Schwarzenbek (DE) --

Item [30], should read:
--      [30]  Foreign Application Priority Data
              December 15, 1999     (DE)……………………..199 60 475
              March 11, 2000        (DE)……………………..100 11 989 --

Signed and Sealed this

Twenty-second Day of October, 2002

*Attest:*

*Attesting Officer*

JAMES E. ROGAN
*Director of the United States Patent and Trademark Office*